No. 648,203.  
Patented Apr. 24, 1900.
R. B. HAMEL.  
COVER FOR BROILERS.  
(Application filed July 19, 1899.)
(No Model.)
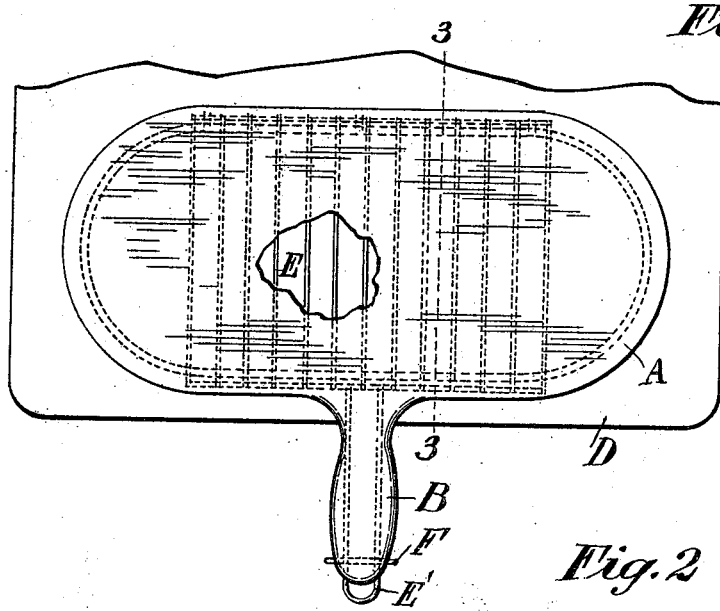
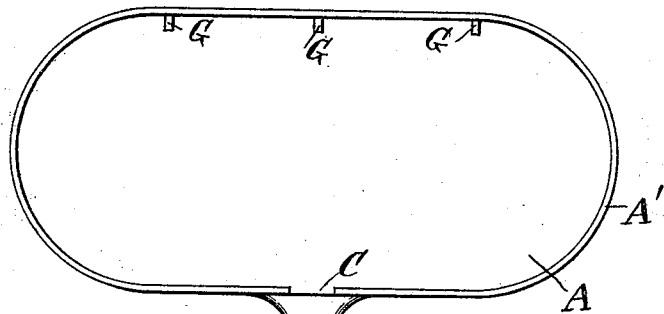
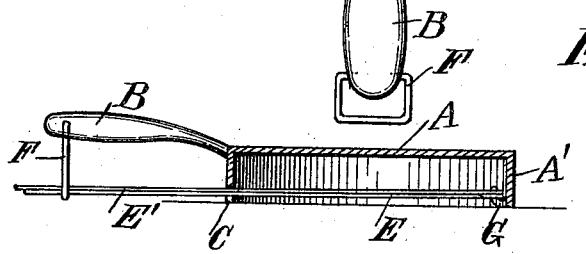
WITNESSES:  
Geo. B Rowley  
W. T. Chamberlain
INVENTOR  
RICHARD B. HAMEL
BY  
Julien T. Davies Jr.  
ATTORNEYS

UNITED STATES PATENT OFFICE.

RICHARD B. HAMEL, OF BELLPORT, NEW YORK.

COVER FOR BROILERS.

SPECIFICATION forming part of Letters Patent No. 648,203, dated April 24, 1900.

Application filed July 19, 1899. Serial No. 724,427. (No model.)

*To all whom it may concern:*

Be it known that I, RICHARD B. HAMEL, a citizen of the United States, residing at Bellport, in the county of Suffolk and State of New York, have invented a new and useful Improvement in Covers for Broilers, of which the following is a specification, reference being had to the accompanying drawings, in which—

Figure 1 is a plan view of my new cover in place on a stove, the top of the cover being broken away to show the broiler underneath. Fig. 2 is an inverted plan view of my new cover; and Fig. 3 is a sectional view on line 3 3 of Fig. 1, but omitting the portion of the stove.

The object of my invention is to provide a cover which will prevent the gases and odors caused by broiling the meat from mingling with and contaminating the air of the room. By means of my new cover these gases are caused to pass up the chimney-flue.

My invention consists in the cover for broilers hereinafter described and claimed.

In the drawings illustrating the principle of my invention and the best method now known to me of applying that principle the broiler A is supported by the stove D (only part of which is shown) and covers the opening left by the removal of the stove-lids and their intermediate support. One of the sides A' of the cover A is provided with hooks G, which engage and support one side of the broiler E. The opposite side of cover A is provided with an open slot C, through which passes the handle E' of the broiler E. To the handle B of the cover A is secured, free to rotate, the stirrup F, which supports the handle E' of the broiler E.

The operation is as follows: The meat is placed within the broiler in the customary manner. The broiler is then hooked upon the hooks G, and the stirrup F is swung under the handle E'. The cover A is then placed over the opening in the stove D left by the removal of the stove-lids and their intermediate support. The covering A extends on all sides around and completely covers the opening, and the gases emanating from the broiling meat pass up the chimney. Again, by the use of the cover A the chimney-draft is maintained at the same volume as when the stove-lids are in place.

I am aware that it is not new to employ covers for broilers to prevent while broiling the escape of smoke and gases into the room and to prevent also the cooling of the fire through change of draft; but heretofore covers for broilers have required specially-constructed broilers in order to use such covers. I know of no instance where any such cover has been constructed and used as is mine that was capable of use with the familiar gridiron-broiler now in common use in nearly every kitchen, and I limit my claims to such a broiler-cover.

What I claim is—

1. A cover for gridiron-broilers adapted to close the opening in the top of a stove and provided with hooks or lugs on its inner walls for the support or holding in place of such a broiler, with a stirrup free to rotate pendent from the handle of the cover for the support of the broiler-handle and with an open slot in one side of the said walls of the cover opposite said hooks or lugs and in line with said stirrup through which said slot the broiler-handle may pass so as to permit of engaging with said stirrup.

2. A cover for gridiron-broilers adapted to close the opening in a stove, consisting of a top A, the handle B, and the curved sides A', said sides being provided on the inner side opposite the handle B with the hooks or lugs G which engage and support one side of the broiler E, and opposite to said hooks with an open slot, through which passes the handle of the broiler, and having the stirrup F secured to the handle B to support the broiler-handle.

In witness whereof I have signed my name to this specification, in the presence of two subscribing witnesses, on this 14th day of July, A. D. 1899.

RICHARD B. HAMEL.

Witnesses:
DANIEL PETTY,
JOHN B. ROBINSON.